D. E. BENNETT.
SHOCK ABSORBER FOR VEHICLES.
APPLICATION FILED AUG. 31, 1910.

995,995.

Patented June 20, 1911.

WITNESSES:

INVENTOR
David E. Bennett
BY
Eugene Owen
ATTORNEY

UNITED STATES PATENT OFFICE.

DAVID E. BENNETT, OF ROCHESTER, NEW YORK, ASSIGNOR OF ONE-THIRD TO GEORGE W. WATTERS AND TWO-THIRDS TO HENRY McGOUGHRAN, BOTH OF ROCHESTER, NEW YORK.

SHOCK-ABSORBER FOR VEHICLES.

995,995.  Specification of Letters Patent.  Patented June 20, 1911.

Application filed August 31, 1910. Serial No. 579,885.

*To all whom it may concern:*

Be it known that I, DAVID E. BENNETT, a citizen of the United States, residing at Rochester, in the county of Monroe and State of New York, have invented certain new and useful Improvements in Shock-Absorbers for Vehicles, of which the following is a specification.

This invention relates to improvements in shock absorbing devices intended more particularly for motor vehicles, whereby the jolting of the vehicle body when passing over inequalities in the road-way will be eliminated; without, however, destroying the resiliency of the supporting springs: and my object is to provide a simple and effective device of this character having a liquid check to retard the motion of the vehicle body, as it rises or falls from normal position under jolts, and further to provide means for regulating the flow of the liquid to control the check.

I attain my object by constructing the absorber in the manner illustrated in the accompanying drawings, in which—

Figure 1:
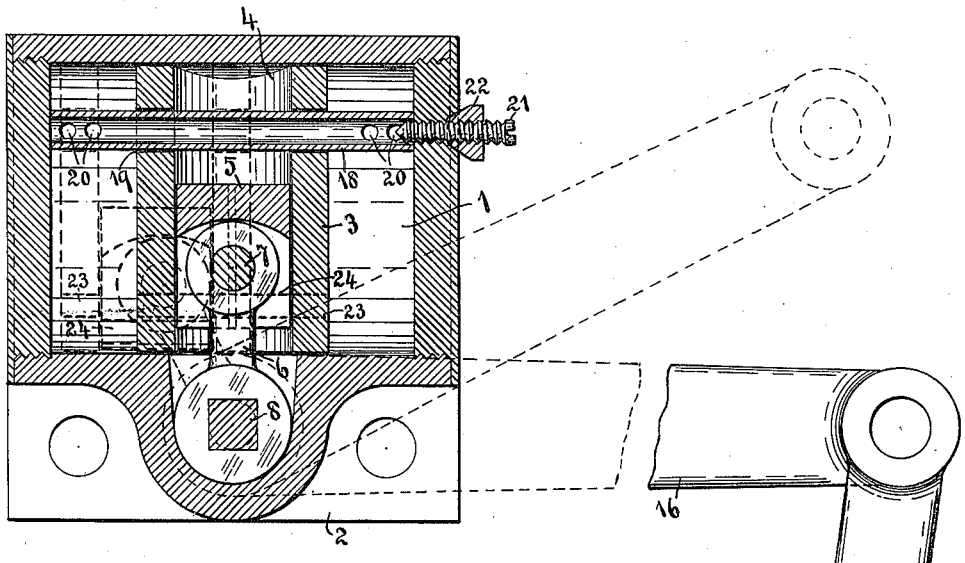
Figure 2:
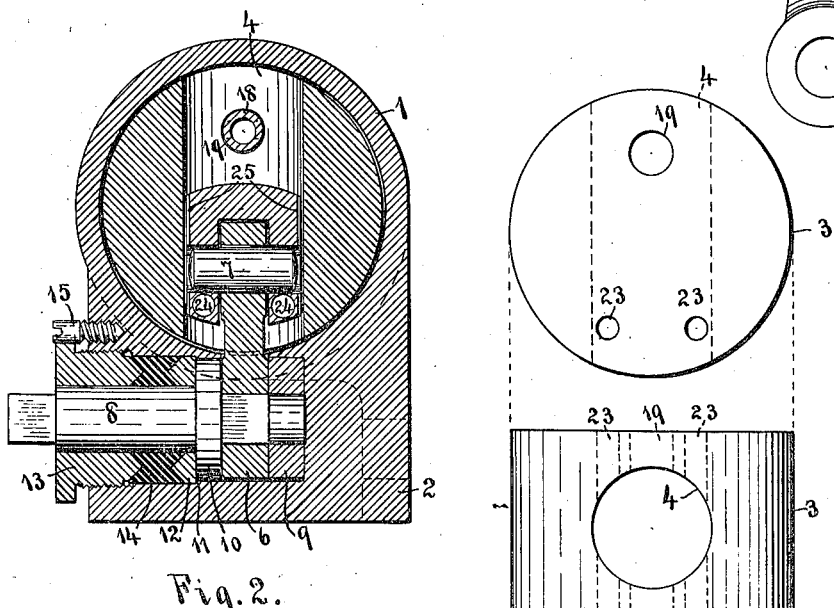
Figure 3:
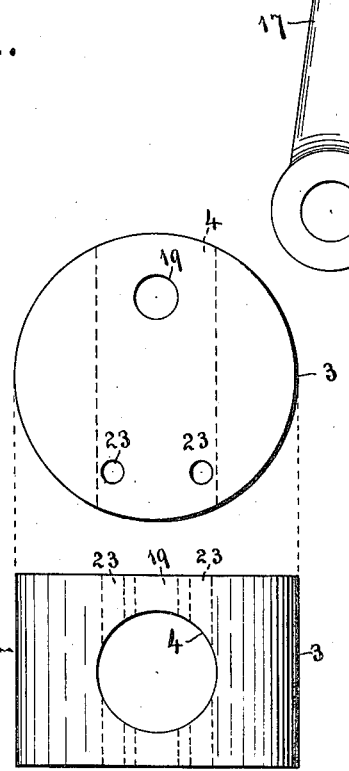

Figure 1 presents a longitudinal section through the device. Fig. 2, a central transverse section through the device, and Fig. 3, an end and plan view respectively of the piston which operates in the liquid containing cylinder.

Like numerals designate like parts in the several views

The device consists of a cylinder 1 provided at 2 with a bracket flange by which to attach it to the vehicle frame, or chassis, adjacent the springs. Within the cylinder is a piston 3, provided with a central transverse bore 4, within which reciprocates a block 5. To this block is coupled the crank arm 6 by means of a pin 7, said crank arm being fastened to an oscillating shaft 8, the inner end of which is journaled in a bearing ring 9 inserted in a chamber provided therefor in the cylinder casting at the side of the cylinder. The shaft 8 is squared to engage the crank arm 6 and, outside of the crank arm, it is provided at 10 with a collar. On the outward side of collar 10, the chamber is enlarged to form a shoulder at 11, against which a packing ring 12 abuts, thus holding the shaft within the chamber with freedom to oscillate therein. A packing gland 13 is screwed into the outer end of the chamber and a packing of suitable material at 14 is inserted between the gland and the packing ring 12. A set screw 15, or other suitable locking device, is provided to engage the rim of the gland to prevent it from turning loose, after the packing has been set up.

At 18, a tube passes from one end of the cylinder to the other through a longitudinal bore 19 in the piston positioned beyond the travel of the block 6; and, at each end, this tube is provided with one or more lateral openings 20, which communicate with the interior of the cylinder 1, and whereby the liquid contained in said cylinder will be allowed to pass from one end of the cylinder to the other, as the piston 3 reciprocates. To control the flow of the liquid through the tube 18, I provide an adjusting screw 21 at one end of the cylinder, which enters the end of the tube 18 and may be screwed into the tube sufficiently to close off entirely the passageways through the openings 20, the position of said screw determining the freedom of flow from one end of the cylinder to the other through the tube. A lock nut 22 is provided to fasten the screw 21 in adjusted position. I also provide passageways for the flow of the liquid from one end of the cylinder to the other through the piston at 23, said passageways 23 being in register with passageways 24 in the block 5, when the crank arm 6 is in mid or normal position; and said passageways 24 being moved out of register with the passageways 23 when the piston is moved to one end of the cylinder or the other by the oscillations of the crank arm 6, the movement of the block, which now acts as a transversely reciprocating valve member causing a gradual shutting off of communication between the respective passageways, as the piston approaches its extreme positions in either direction.

To permit of the flow of the liquid in the bore 4 from one side of the block to the other, as said block reciprocates under the motion of the crank arm, I preferably provide longitudinal grooves 25 at opposite sides of the block, said grooves being positioned to communicate with the bearings for the crank pin 7 to facilitate the lubrication thereof.

It will, of course, be understood that one of these absorbers will be placed at each side of the vehicle over or adjacent one or both axles, and that the cylinders may be positioned in any desired manner according to the construction of the vehicle, either to stand horizontally, as shown in the drawings, or vertically; in which latter case, the lever arm 16 will be set on the oscillating shaft 8 in line with the crank arm 6, instead of at right angles thereto. Any means for coupling the link 17 to the axle, or spring, or spring clips may be employed.

When in operation, (the cylinder being filled with oil, or other suitable fluid), a rise of the axle, or a depression of the vehicle body, due to jolt, will give an upward turn to the lever arm 16, as indicated by the broken line position shown in Fig. 1, thereby moving the piston 13 over to the left in said figure. At first this movement will be free, by reason of the passageways through the tube 18 and the bores 24 and 23 being fully open. As the piston approaches the end of its stroke, the passage of liquid through the bores 24 and 23 will be gradually cut off, thereby slowing down the flow of liquid from one end of the cylinder to the other; and, as the piston reaches the openings 20 in the tube 18, a still further reduction of the flow will be caused, until finally, when in extreme position, the motion of the piston, and consequently of the lever 16, will be entirely checked. Upon the rebound, if the lever 16 passes below normal position, the piston 3 will be moved to the right, and the downward motion will be checked by the flow of liquid from the right hand end back to the left hand end of the cylinder. As before said, the degree of check may be regulated by the adjusting screw 21 so as to give more or less freedom of flow through the tube 18.

What I claim as my invention and desire to secure by Letters Patent is—

1. A shock absorber comprising a fluid containing cylinder, a piston therein, a tube extending from one end of the cylinder to the other through a corresponding bore in the piston, said tube being provided at each end with one or more lateral openings, means for controlling the flow of fluid through said openings at one end of the tube, a lever arm, and means connecting said arm to the piston for imparting motion thereto.

2. A shock absorber comprising a fluid containing cylinder, a piston therein provided with a passageway through which the fluid will flow from one side of the piston to the other as the piston reciprocates, a valve member on the piston adapted to reciprocate transversely across the passageway, an oscillating shaft mounted transversely to the cylinder, a crank arm thereon within the cylinder, means whereby the crank arm will impart simultaneous motion to the valve member and piston, and an outside lever arm attached to the shaft.

3. A shock absorber comprising a fluid containing cylinder, a piston therein, an oscillating shaft mounted transversely to the cylinder at one side thereof, a crank arm thereon which enters the cylinder, a block mounted to slide in a transverse bore in the piston and coupled to the free end of the crank arm, the piston and block being provided with one or more passageways which register when the piston is in mid position and which provide for the flow of fluid from one side of the piston to the other, and an outside lever arm attached to the shaft.

4. A shock absorber comprising a fluid containing cylinder, a piston therein, an oscillating shaft mounted transversely to the cylinder at one side thereof, a crank arm thereon which enters the cylinder, a block mounted to slide in a transverse bore in the piston and coupled to the free end of the crank arm, the piston and block being provided with one or more passageways which register when the piston is in mid position and which provide for the flow of fluid from one side of the piston to the other, a tube extending from one end of the cylinder to the other through the piston beyond the travel of said block, said tube being provided at each end with one or more lateral openings, means for controlling the flow of fluid through said openings at one end of the tube, and an outside lever arm attached to the shaft.

In testimony whereof I have affixed my signature, in presence of two witnesses.

DAVID E. BENNETT.

Witnesses:
M. E. VERBECK,
EUGENE DIVEN.